Figure 1:
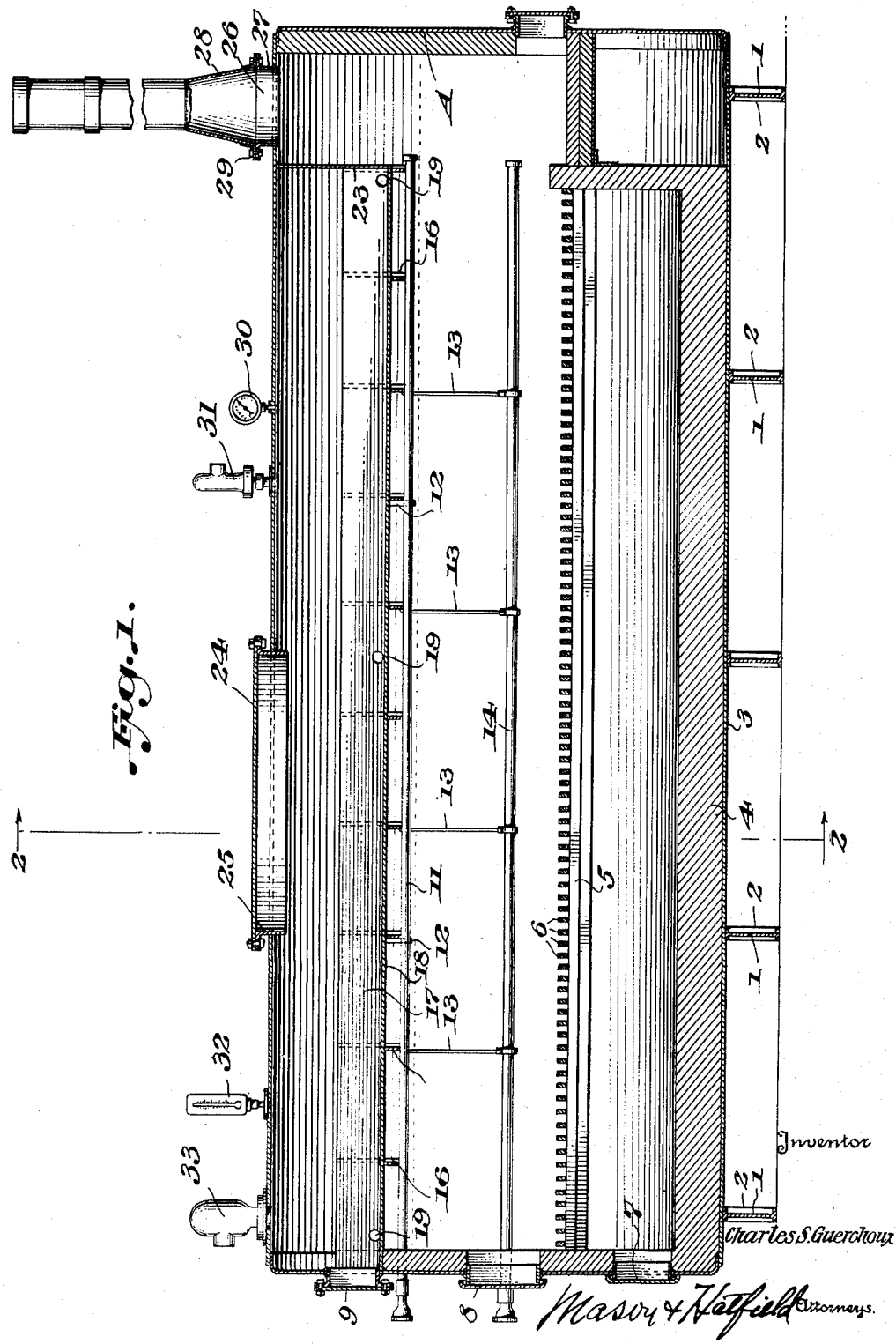

Patented Aug. 1, 1950

2,517,202

UNITED STATES PATENT OFFICE 2,517,202

COMBINATION INCINERATOR AND RECLAIMER

Charles S. Guerchoux, New Orleans, La.

Application February 11, 1947, Serial No. 727,924

5 Claims. (Cl. 23—290.5)

This invention relates to a combination garbage, condemned food, and meat disposal apparatus, especially adapted for use on a boat such as a barge, and is a continuation in part of my application entitled "Mobile Incinerator, Garbage Container and Chute," filed December 19, 1946, Serial No. 717,115, patented June 1, 1948 as Patent No. 2,442,686.

An object of the invention is to provide a combined incinerator and reclaimer that simultaneously performs the operation of reclaiming fats, glycerin and bones, which materials constitute a large part of a ship's garbage.

Another object of the invention is to provide a reclaimer of special construction that includes means for withdrawing the liquids, such as the melted fats, from the reclaimer of the apparatus.

A further object of the invention is to provide an incinerator and reclaimer apparatus that is particularly adapted for mounting on a small vessel in position for receiving refuse from a ship which has come into port, whereby condemned matter such as garbage, spoiled meat, etc., may be transferred directly from the ship to the reclaiming department of the apparatus.

An additional object of the invention is to provide an apparatus adapted for mounting on a barge, having a reclaiming compartment provided with an opening that may be positioned directly beneath a refuse chute, such as disclosed in my co-pending application.

Further objects will appear hereinafter throughout the specification.

Figure 2:
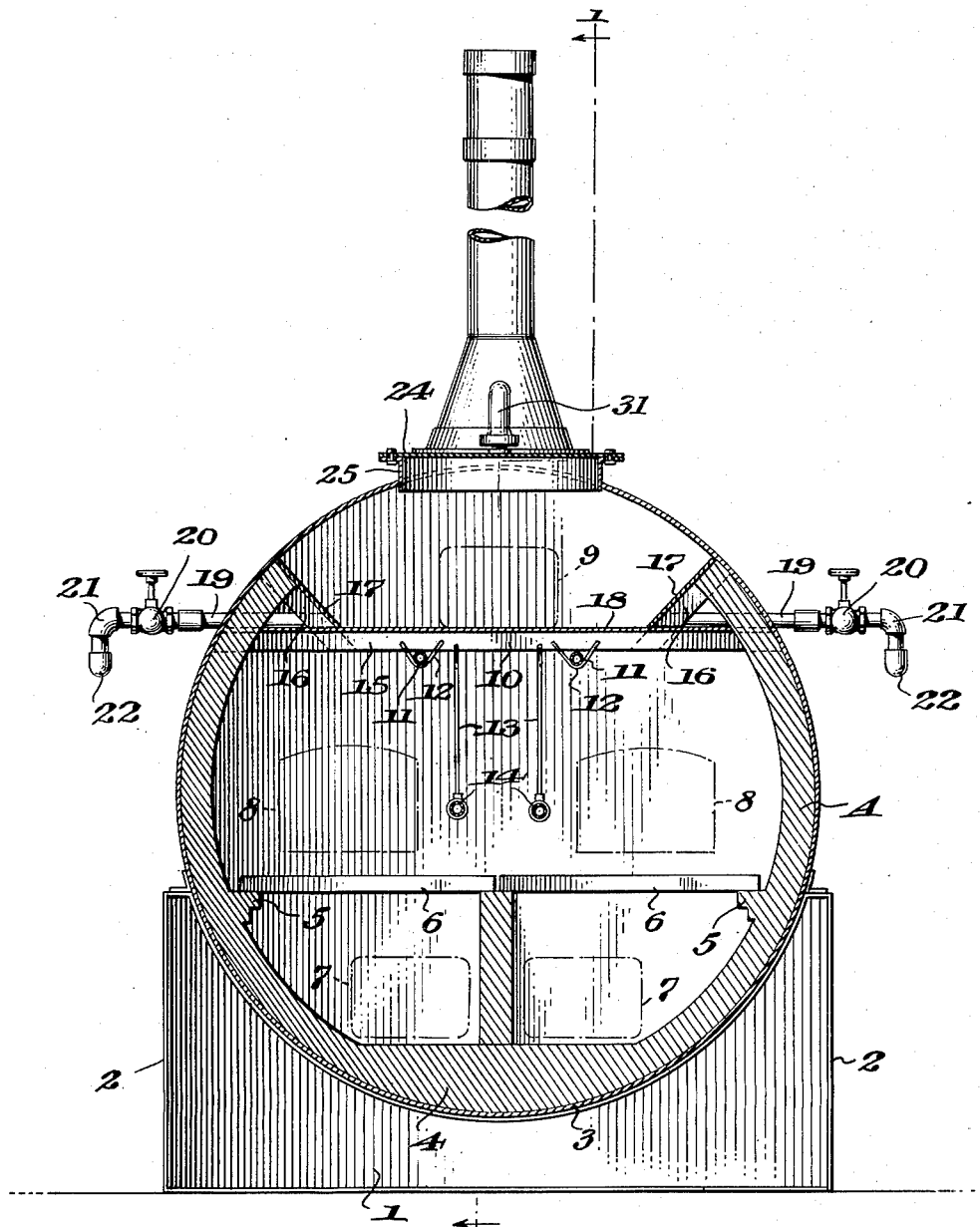

In the drawings:

Figure 1 is a longitudinal vertical section of the apparatus of this invention, taken on the lines 1—1 of Figure 2, and Figure 2 is a transverse vertical section of the apparatus shown in Figure 1 along the line 2—2.

There is no condition among civilized peoples which offers the hazards of communicating diseases to human and animal life that is presented by the entry of ships into the ports of a country. This is due in large part to the fact that such ships, either while at anchor or when tied to wharves, etc., dispose of their garbage, and any goods which have spoiled in transit, by dumping such refuse over the sides of the ships into the surrounding waters. This results in pollution of these waters and exposes humans and animals to various and sundry contagious diseases. In order to prevent this condition, and at the same time to reclaim the refuse, or at least portions thereof, the present apparatus has been devised. It is important that the present apparatus be mounted on a mobile vessel, such as a barge, so that the service performed by the reclaimer and/or incinerator may be conducted as soon as the ship comes into port and thereby enjoin the above condition. It may be mounted directly on a barge which may be tied or anchored adjacent the freighter or other ship, and the refuse deposited directly from the ship into the reclaimer portion of the apparatus, assuming that the freighter is provided with a chute or other mechanism for disposing of the refuse. In some cases, however, the refuse may be shoveled by hand, and in other cases mechanical means may be used to transfer, usually by gravity, the refuse from the freighter to the reclaimer and/or incinerator portions of the apparatus.

By means of the present invention, all accumulated garbage, swill and contaminated foods of all description may be immediately disposed of by mooring a barge or other vessel containing the apparatus of this invention alongside the vessel which desires to dispose of the said garbage, etc.

The apparatus consists generally of an incinerator section and a reclaimer section. The reclaimer section consists of a sealed unit, preferably constructed of boiler plate, that is built and constructed in strict conformity with A. S. M. E. code and all other agencies, such as the American Bureau of Shipping and the Bureau of Marine Navigation, and in accordance with the inspection laws of the United States Coast Guard. The purpose of the reclaimer section is to arrest fermentation and oxidation in ships' garbage, and other commodities that may be contaminated, including stores, foods, etc., and especially those commodities that must be destroyed under the supervision of the Bureau of Animal Industry and the Bureau of Entomology.

The source of heat for the reclaimer is a furnace which may be used as an incinerator for condemned materials having no elements which may be reclaimed. Thus the heat energy for the reclaimer may be furnished wholly or in part in the furnace by portions of the condemned material that is not subject to being reclaimed. If such material is insufficient to provide combustion in the furnace, a suitable fuel is introduced into the furnace to enhance combustion to thereby furnish the necessary B. t. u.'s to generate the required temperature for boiling the condemned materials that have been placed in the reclaimer.

All elements in the reclaimer which have been subjected to heat, such as fats, glycerine, etc., are separately drawn off from the reclaimer. Means is provided for removing other elements after treatment, such as bones and other by-products that have a reclaiming value.

In the drawings the letter A indicates the apparatus as a whole. This apparatus is provided with a suitable base 1 that may be mounted directly on the floor of the barge or other vessel, in a manner similar to the incinerator shown in my co-pending application. The base includes a plurality of girders 2 which extend in a direction transverse to the apparatus. A shell 3 of substantially cylindrical design is supported by the girders. Mounted within the shell is a lining 4 that extends upwardly on either side where it terminates adjacent the reclaimer section hereinafter described. The lining may be constructed of any suitable material for the purpose intended, and is provided with shoulders 5 which support grates 6. Ashes or other burned material may be removed through the doors 7. Material which is to be exposed to the incineration process is deposited by means of the doors 8 onto the grates for burning.

The reclaimer is indicated as a whole by 10. It is supported within the cylindrical shell by means of transverse supports 15 that are anchored at their ends by the lining 4. These bars also support the base plate 18 as shown in Figure 2. Supporting bar 16 serves to support and position the inclined plates 17 forming the sides of the reclaimer. The top of the reclaimer is the upper portion of the cylindrical shell 3. One end of the reclaimer is provided with a cleaning opening 9. Extending longitudinally on either side of the shell are a plurality of spaced headers 19. These headers are pipes which extend through the shell and lining and also into apertures provided for them in the inclined plates 17. Each header is provided with a hand operated valve 20, an elbow 21, and a second elbow 22, to which may be connected a pipe (not shown) leading to a suitable receptacle for the reclaimed fats in liquid form. One end of the reclaimer is defined by wall 23 as shown in Figure 1. Material may be deposited in the reclaimer by removal of the closure 24 mounted on ring 25 which has been welded or otherwise attached to an opening in the top of the shell 3. The smokestack 26 includes a ring 27 mounted in another opening in the top of the shell, that is located above the space defined by the reclaimer wall 23 and one end of the shell. Mounted on the ring 27 is the conventional smokestack 28 that is attached to the ring by bolts 29.

Extending through the top of the shell so as to communicate with the space within the reclaimer is a gauge 30, safety valve 31, thermometer 32, and atmospheric valve 33.

One or more pipes 11 are supported in slings 12. Depending from straps 13 is supported pipe 14. The pipes 11 and 14 are connected to a source of inflammable gas or oil and are perforated to thereby form burners.

The burner 12 may be used as the sole source of combustion for the reclaimer. Preferably, however, these are only used when the incinerator is not in operation, although they may be used to supplement the heat from the incinerator. The burners 14 are preferably used only when the material in the incinerator is insufficient to support combustion. For instance, the condemned stores, such as food products, etc., having been deposited on the grates 6 contain too much moisture to burn properly. This condition is alleviated by lighting the burners 14.

It has been found, also, that the material within the reclaimer may be preliminarily heated by the burners 12 until the materials to be incinerated have been deposited through doors 8 into grates 6 where they will furnish the necessary amount of heat to the reclaimer. It has been further found that it is sometimes necessary to make immediate disposition of the infected contents and, when this is the case, the burners 12 and 14 may be used to provide the proper amount of heat to speed up the burning of infected contents or to insure sterility of the disease-carrying goods in a short time.

It will be appreciated that the apparatus of this invention is particularly adapted for the disposal and reclaiming of various stores from ships which have been condemned and which it is desired to dispose of without danger of contamination of harbors or other waters.

It is to be noted further, that the incinerator is a non-pressure vessel and, accordingly, may be constructed of light materials, thereby being of low cost construction. The reclaimer, as will be noted particularly from Figure 2, is entirely of metal and includes a portion of the cylindrical shell, the major portion of which forms the incinerator.

The construction of the liner 4 is a particular feature of the present invention in that the said liner forms the support for the grate 6 and for the inclined plates 17 and the base plates 18 and headers 19 of the reclaimer.

The walls of the reclaimer, therefore, are constructed entirely of metal and form a pressure section. The apparatus may be used as follows: When a ship such as a freighter has on it stores which have been condemned, a barge with the apparatus disclosed in the figures mounted thereon is moved adjacent the ship. Any condemned stores having any reclaiming value thereto are fed by means of a chute, such as shown in my co-pending application or other suitable removing means, through the opening 25 into the reclaiming compartment. Other stores from the said freighter which have little or no reclaiming constituence may be deposited on the deck of the barge containing the present apparatus and from there fed through the doors 8 onto the grill 6. If the material thus fed is insufficient to support combustion, the burners 14 are lit. These may be supplemented by the burners 12, either earlier to preliminarily heat the substances within the reclaimer or later to supplement the heat from either the burners 14 or the substances being incinerated on the grates 6. The opening 25 is closed by the cover 24 before pressure begins to build up within the reclaimer.

When the substances begin to melt, one or more of the header valves 20 is operated to draw off the oils, etc. After the reclaiming operation is completed, the door 9 is opened and bones and other material are withdrawn through the opening 9.

Having thus fully described my invention, it is to be understood that my invention is not to be limited by the specific illustration and description, but is of the full scope of the appended claims.

I claim:

1. In an apparatus for incinerating and reclaiming materials, a shell, the combination of an incinerator and a reclaimer mounted within said shell, a liner in said shell, said liner extending upwardly and terminating in supporting ledges, said shell extending beyond said liner, inclined plates forming the sides of said reclaimer at least partially supported on said ledges and extending to said shell, the upper part of said shell forming the top of said reclaimer, a supporting means extending transversely across said apparatus and supported by said lining, a base means supported by said transverse supporting means and forming the base of said reclaimer, and a plurality of spaced outlet pipes extending through said shell, liner and through said inclined plates to the interior of said reclaimer for draining off the reclaimed liquids, and burner means in said apparatus, below said reclaimer, a grate extending lengthwise of said apparatus, shoulder means on the sides of said shell and below said base for supporting said grate, the space between said grate and said base forming an incinerator chamber.

2. In an apparatus for incinerating and reclaiming materials, a shell, the combination of an incinerator and a reclaimer mounted within said shell, a liner in said shell, said liner extending upwardly and terminating in supporting ledges, said shell extending beyond said liner, inclined plates forming the sides of said reclaimer at least partially supported on said ledges and extending to said shell, the upper part of said shell forming the top of said reclaimer, a supporting means extending transversely across said apparatus and supported by said lining, a base means supported by said transverse supporting means and forming the base of said reclaimer, and a plurality of spaced outlet pipes extending through said shell, liner and through said inclined plates to the interior of said reclaimer for draining off the reclaimed liquids, and burner means in said apparatus, below said reclaimer, a grate extending lengthwise of said apparatus, shoulder means on the sides of said shell and below said base for supporting said grate, the space between said grate and said base forming an incinerator chamber, said supporting means further comprising a plurality of spaced supports and fuel pipe means including burner means, mounted below said supports whereby said base may be heated by said burner means.

3. In an apparatus for incinerating and reclaiming materials, a shell, the combination of an incinerator and a reclaimer mounted within said shell, a liner in said shell, said liner extending upwardly and terminating in supporting ledges, said shell extending beyond said liner, inclined plates forming the sides of said reclaimer at least partially supported on said ledges and extending to said shell, the upper part of said shell forming the top of said reclaimer, a supporting means extending transversely across said apparatus and supported by said lining, a base means supported by said transverse supporting means and forming the base of said reclaimer, and a plurality of spaced outlet pipes extending through said shell, liner and through said inclined plates to the interior of said reclaimer for draining off the reclaimed liquids, and burner means in said apparatus, below said reclaimer, a grate extending lengthwise of said apparatus, shoulder means on the sides of said shell and below said base for supporting said grate, the space between said grate and said base forming an incinerator chamber, said supporting means further comprising a plurality of spaced supports and fuel pipe means including burner means, mounted on said supports whereby said base may be heated by said burner means.

4. In an apparatus for incinerating and reclaiming materials, a shell, the combination of an incinerator and a reclaimer mounted within said shell, a liner in said shell, said liner extending upwardly and terminating in supporting ledges, said shell extending beyond said liner, inclined plates forming the sides of said reclaimer at least partially supported on said ledges and extending to said shell, the upper part of said shell forming the top of said reclaimer, a supporting means extending transversely across said apparatus and supported by said lining, a base means supported by said transverse supporting means and forming the base of said reclaimer, and a plurality of spaced outlet pipes extending through said shell, liner and through said inclined plates to the interior of said reclaimer for draining off the reclaimed liquids, and burner means in said apparatus, below said reclaimer, a grate extending lengthwise of said apparatus, shoulder means on the sides of said shell and below said base for supporting said grate, the space between said grate and said base forming an incinerator chamber, said inclined plates, the said upper part of said shell and said base forming part of said reclaimer, said reclaimer having end walls.

5. In an apparatus for incinerating and reclaiming materials, a shell, the combination of an incinerator and a reclaimer mounted within said shell, a liner in said shell, said liner extending beyond said liner, inclined plates forming the sides of said reclaimer at least partially supported on said ledges and extending to said shell, the upper part of said shell forming the top of said reclaimer, a supporting means extending transversely across said apparatus and supported by said lining, a base means supported by said transverse supporting means and forming the base of said reclaimer, and a plurality of spaced outlet pipes extending through said shell, liner and through said inclined plates to the interior of said reclaimer for draining off the reclaimed liquids, and burner means in said apparatus, below said reclaimer, a grate extending lengthwise of said apparatus, shoulder means on the sides of said shell and below said base for supporting said grate, the space between said grate and said base forming an incinerator chamber, said inclined plates, the said upper part of said shell and said base forming part of said reclaimer, said reclaimer having end walls, one of said end walls terminating short of the end of said apparatus to provide a vertical space, a chimney on said apparatus above said space, and an opening in said other vertical wall and a closure for said opening.

CHARLES S. GUERCHOUX.

REFERENCES CITED

The following references are of record in the file of this patent:

UNITED STATES PATENTS

| Number | Name | Date |
| --- | --- | --- |
| 136,129 | Broadnax | Feb. 25, 1873 |
| 215,659 | Orrman | May 20, 1879 |
| 754,135 | Grubitz | Mar. 8, 1904 |
| 1,257,359 | Johnson | Feb. 26, 1918 |
| 1,446,262 | Macdonald | Feb. 20, 1923 |
| 2,064,953 | Serpas | Dec. 22, 1936 |

FOREIGN PATENTS

| Number | Country | Date |
| --- | --- | --- |
| 4,600 | Great Britain | Mar. 28, 1887 |